(12) United States Patent
Ibe et al.

(10) Patent No.: US 10,196,729 B2
(45) Date of Patent: Feb. 5, 2019

(54) SLURRY FOR THERMAL SPRAYING, SPRAYED COATING, AND METHOD FOR FORMING SPRAYED COATING

(71) Applicant: FUJIMI INCORPORATED, Kiyosu-shi, Aichi (JP)

(72) Inventors: Hiroyuki Ibe, Aichi (JP); Kazuto Sato, Aichi (JP); Kazuyuki Tsuzuki, Aichi (JP); Takaya Masuda, Aichi (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 0 days.

(21) Appl. No.: 15/258,118

(22) Filed: Sep. 7, 2016

(65) Prior Publication Data

US 2017/0088930 A1 Mar. 30, 2017

(30) Foreign Application Priority Data

Sep. 25, 2015 (JP) ................. 2015-188833

(51) Int. Cl.
| | |
|---|---|
| C09D 5/03 | (2006.01) |
| C23C 4/129 | (2016.01) |
| C23C 4/134 | (2016.01) |
| C23C 4/10 | (2016.01) |
| C09D 1/00 | (2006.01) |
| C09D 5/02 | (2006.01) |
| C09D 7/40 | (2018.01) |

(52) U.S. Cl.
CPC ............. *C23C 4/134* (2016.01); *C09D 1/00* (2013.01); *C09D 5/024* (2013.01); *C09D 5/031* (2013.01); *C09D 7/70* (2018.01); *C23C 4/10* (2013.01); *C23C 4/129* (2016.01)

(58) Field of Classification Search
None
See application file for complete search history.

(56) References Cited

U.S. PATENT DOCUMENTS

| | | |
|---|---|---|
| 4,450,184 A | 5/1984 | Longo et al. |
| 4,741,838 A | 5/1988 | Sharpe, Jr. |
| 4,755,492 A | 7/1988 | Greskovich et al. |
| 4,884,788 A | 12/1989 | Shaffer |
| 5,433,901 A | 7/1995 | Rancoule et al. |

(Continued)

FOREIGN PATENT DOCUMENTS

| | | |
|---|---|---|
| EP | 1 652 953 A1 | 5/2006 |
| EP | 2 868 766 A1 | 5/2015 |

(Continued)

OTHER PUBLICATIONS

European Search Report dated Mar. 1, 2017 issued in EP Application No. 16194314.7.

(Continued)

*Primary Examiner* — Colin W. Slifka
(74) *Attorney, Agent, or Firm* — Foley & Lardner LLP

(57) ABSTRACT

To provide a slurry for thermal spraying. In the slurry, even when spray particles precipitate, the precipitates easily disappear. The present invention provides a slurry for thermal spraying including spray particles and a dispersion medium. The spray particles have an average circularity in a plan view of 0.85 or less. The spray particles preferably have an average circularity of 0.6 or more. The spray particles may include yttrium fluoride and an yttrium oxyfluoride.

17 Claims, 1 Drawing Sheet

10μm

(56) References Cited

U.S. PATENT DOCUMENTS

| | | |
|---|---|---|
| 6,469,226 B1 | 10/2002 | Chica Lara et al. |
| 7,115,832 B1 | 10/2006 | Blankenship et al. |
| 7,250,080 B1 | 7/2007 | Craig et al. |
| 2002/0160189 A1 | 10/2002 | Wataya et al. |
| 2002/0177014 A1* | 11/2002 | Kaneyoshi .......... C01F 17/0043 428/702 |
| 2003/0136467 A1 | 7/2003 | Hiratsu et al. |
| 2004/0197580 A1 | 10/2004 | Dorfman et al. |
| 2004/0221516 A1 | 11/2004 | Cho et al. |
| 2006/0091119 A1 | 5/2006 | Zajchowski et al. |
| 2006/0093748 A1 | 5/2006 | Zajchowski et al. |
| 2006/0110320 A1 | 5/2006 | Aoki et al. |
| 2006/0121068 A1 | 6/2006 | Sane et al. |
| 2006/0151321 A1 | 7/2006 | Itoh et al. |
| 2007/0023402 A1 | 2/2007 | Zajchowski et al. |
| 2007/0087129 A1 | 4/2007 | Blankenship et al. |
| 2007/0094936 A1 | 5/2007 | Cho et al. |
| 2009/0208662 A1 | 8/2009 | Blankenship et al. |
| 2009/0314202 A1 | 12/2009 | Zajchowski et al. |
| 2010/0199494 A1 | 8/2010 | Zajchowski et al. |
| 2010/0330282 A1 | 12/2010 | Nienburg et al. |
| 2011/0086178 A1 | 4/2011 | Ruud et al. |
| 2011/0123431 A1 | 5/2011 | Toma et al. |
| 2011/0237421 A1 | 9/2011 | Burgess et al. |
| 2013/0040801 A1 | 2/2013 | Schrems et al. |
| 2013/0068729 A1 | 3/2013 | Zajchowski et al. |
| 2013/0098879 A1 | 4/2013 | Zajchowski et al. |
| 2014/0178641 A1 | 6/2014 | Leblanc et al. |
| 2014/0360407 A1 | 12/2014 | Kitamura et al. |
| 2015/0307715 A1 | 10/2015 | Sato et al. |
| 2016/0024328 A1 | 1/2016 | Kitamura et al. |
| 2016/0040278 A1 | 2/2016 | Kitamura et al. |
| 2017/0088930 A1 | 3/2017 | Ibe et al. |
| 2017/0283933 A1 | 10/2017 | Ibe et al. |

FOREIGN PATENT DOCUMENTS

| | | |
|---|---|---|
| JP | 58-151474 A | 9/1983 |
| JP | 60-149403 A | 8/1985 |
| JP | 01-316258 A | 12/1989 |
| JP | 02-097459 A | 4/1990 |
| JP | 08-104969 A | 4/1996 |
| JP | 10-088311 A | 4/1998 |
| JP | 10-298732 A | 11/1998 |
| JP | 2002-080954 A | 3/2002 |
| JP | 2004-331852 A | 11/2004 |
| JP | 2005-002446 A | 1/2005 |
| JP | 2006-131997 A | 5/2006 |
| JP | 2006-144094 A | 6/2006 |
| JP | 3892300 B2 | 3/2007 |
| JP | 2009-161789 A | 7/2009 |
| JP | 2010-150617 A | 7/2010 |
| JP | 2010-218759 A | 9/2010 |
| JP | 2011-088037 A | 5/2011 |
| JP | 2011-522115 A | 7/2011 |
| JP | 2011-168456 A | 9/2011 |
| JP | 2011-524944 A | 9/2011 |
| JP | 2013-136814 A | 7/2013 |
| JP | 2014-083110 A | 5/2014 |
| JP | 2014-122418 A | 7/2014 |
| JP | 2014-240511 A | 12/2014 |
| WO | WO-97/18341 A1 | 5/1997 |
| WO | WO-02/40182 A1 | 5/2002 |
| WO | WO-2008/036887 A2 | 3/2008 |
| WO | WO-2009/143626 A1 | 12/2009 |
| WO | WO-2013/099890 A1 | 7/2013 |
| WO | WO-2014/142017 A1 | 9/2014 |
| WO | WO-2014/142018 A1 | 9/2014 |
| WO | WO-2015/019673 A1 | 2/2015 |
| WO | WO-2016/043754 A1 | 3/2016 |

OTHER PUBLICATIONS

Taiwanese Office Action issued in application No. 103108410 dated Aug. 11, 2017.
U.S. Office Action issued in co-pending U.S. Appl. No. 14/773,863 dated Feb. 16, 2018.
U.S. Office Action issued in co-pending U.S. Appl. No. 14/773,863 dated Apr. 21, 2017.
U.S. Office Action issued in co-pending U.S. Appl. No. 14/773,863 dated Feb. 21, 2017.
U.S. Office Action issued in co-pending U.S. Appl. No. 14/773,863 dated Sep. 25, 2017.
U.S. Office Action issued in co-pending U.S. Appl. No. 14/773,874 dated Aug. 25, 2017.
U.S. Office Action issued in co-pending U.S. Appl. No. 14/773,874 dated Dec. 20, 2016.
U.S. Office Action issued in co-pending U.S. Appl. No. 14/773,874 dated Apr. 3, 2017.
U.S. Office Action issued in co-pending U.S. Appl. No. 15/258,131 dated Oct. 12, 2017.
U.S. Office Action issued in co-pending U.S. Appl. No. 15/297,464 dated Dec. 6, 2017.
Kitamura et al.: U.S. Office Action on U.S. Appl. No. 14/773,874 dated Mar. 19, 2018.
Final Office Action on U.S. Appl. No. 15/297,464 dated Jul. 23, 2018.
Non-Final Office Action on U.S. Appl. No. 15/258,131 dated Sep. 4, 2018.
Notice of Allowance on U.S. Appl. No. 14/773,874 dated Sep. 17, 2018.
Final Office Action on U.S. Appl. No. 14/773,863 dated Jul. 25, 2018.

* cited by examiner

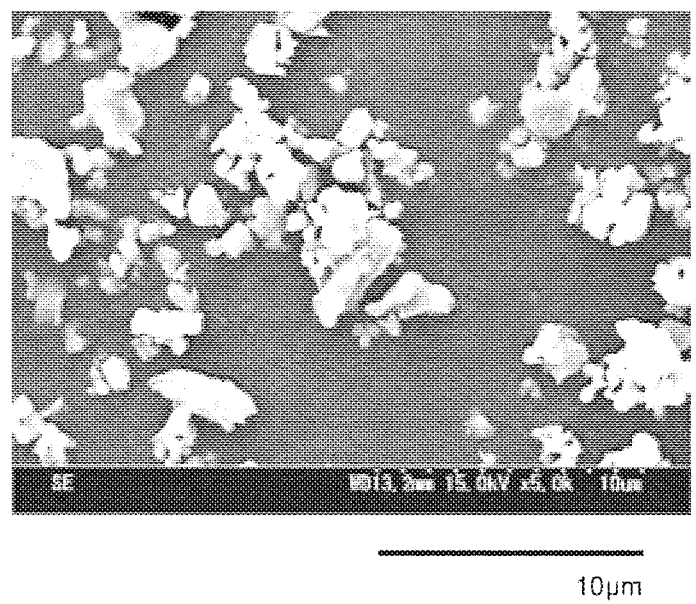
10μm

SLURRY FOR THERMAL SPRAYING, SPRAYED COATING, AND METHOD FOR FORMING SPRAYED COATING

BACKGROUND OF THE INVENTION

Field of the Invention

The present invention relates to a slurry for thermal spraying including spray particles, a sprayed coating, and a method for forming the sprayed coating.

Description of the Related Art

Sprayed coatings are formed by thermal spraying of spray particles to substrates. The sprayed coatings are used for various applications according to characteristics of materials constituting the spray particles. For example, aluminum oxide sprayed coatings are used as protective coatings of various members because aluminum oxide exhibits high electrical insulating properties, abrasion resistance, and corrosion resistance (for example, see Patent Document 1). Yttrium oxide sprayed coatings are used as protective coatings of members in semiconductor device production apparatuses because yttrium oxide exhibits high plasma erosion resistance (etching resistance, corrosion resistance). Such a sprayed coating can be formed by thermal spraying of not only powdery spray particles but also a slurry containing spray particles (for example, see Patent Document 2).

CITATION LIST

Patent Literature

PTL 1: JP 2014-240511 A
PTL 2: JP 2010-150617 A

SUMMARY OF THE INVENTION

However, when a slurry is stored, spray particles in the slurry may sediment due to gravity to give precipitates. The spray particles that have precipitated are required to be redispersed before thermal spraying of the slurry, and thus a slurry that gives precipitates is likely to be considered to be unsuitable for practical use. In another aspect, as semiconductor devices are increasingly more integrated, semiconductor device production apparatuses are required to be controlled more exactly not to be contaminated with particles (foreign substances) therein. When a slurry capable of forming precipitates is used to form a sprayed coating, pores are likely to be formed in the sprayed coating, and the pores can become the generation source of fine particles, which did not cause problems before, for example.

In view of the above circumstances, the present invention intends to provide a slurry for thermal spraying. In the slurry, precipitates easily disappear even when spray particles precipitate. The present invention also intends to provide a sprayed coating as a thermal spray product of the slurry for thermal spraying and a method for forming the sprayed coating.

As a result of intensive studies, the inventors of the present invention have found that precipitates of spray particles can easily disappear by using spray particles having shapes that are not the shapes capable of improving flowability, contrary to common knowledge of spray particles. The present invention has been made on the basis of such knowledge. In other words, the present invention is a slurry for thermal spraying including spray particles and a dispersion medium. The spray particles have an average circularity in a plan view of 0.85 or less.

In the slurry for thermal spraying, the spray particles do not have substantially the spherical shape, which is suitable for improving flowability, but have a nonspherical shape. The spray particles have such a shape that particles that have precipitated do not form hard aggregates. When having such a structure, the slurry for thermal spraying allows spray particles that have precipitated to be easily in a preferred dispersion state. This can improve feeding performance when the slurry is fed to a thermal spraying apparatus. In other words, the slurry for thermal spraying can obtain redispersibility. In addition, the generation of pores in a sprayed coating due to low feeding performance of the slurry can be suppressed.

In a preferred aspect of the slurry for thermal spraying disclosed here, the spray particles have an average circularity of 0.6 or more. Such a structure reduces surface unevenness of the spray particles and reduces the probability that the spray particles incorporate gas at the time of thermal spraying. This can more certainly reduce the porosity of a sprayed coating formed by using the slurry for thermal spraying.

In a preferred aspect of the slurry for thermal spraying disclosed here, the spray particles have an average particle size of 100 nm or more and 8 μm or less. Such a structure allows spray particles that have low thermal spraying efficiency in a powder form to be suitably used as a material for thermal spraying. The small spray particles enables the formation of a dense sprayed coating.

In the present description, the "average particle size" of spray particles is an average particle size (sphere equivalent diameter) calculated on the basis of specific surface area, for spray particles having an average particle size of less than 1 μm. The average particle size D is a value calculated in accordance with the equation: $D=6/(\rho S)$ where S is the specific surface area of spray particles and $\rho$ is the density of the material constituting spray particles. For example, when the spray particles are yttrium oxide (yttria; $Y_2O_3$), the average particle size can be calculated where the density $\rho$ is 5.01 g/cm³. The specific surface area of spray particles can be a value determined by a gas adsorption method, for example, and can be measured in accordance with JIS Z 8830: 2013 (ISO9277: 2010) "Determination of the specific surface area of powders (solids) by gas adsorption". For example, the specific surface area of spray particles can be determined by using a surface area analyzer, trade name "FlowSorbII 2300" manufactured by Micromeritics. For spray particles having an average particle size of 1 μm or more, the particle size at an integrated value of 50% in volumetric particle size distribution (50% cumulative particle size) determined with a particle size distribution analyzer based on the laser diffraction/scattering method is used as the "average particle size".

In a preferred aspect of the slurry for thermal spraying disclosed here, the spray particles include at least one type of ceramics and inorganic compounds. The slurry having such a structure enables the formation of a sprayed coating having excellent plasma erosion resistance.

In a preferred aspect of the slurry for thermal spraying disclosed here, the inorganic compound includes a compound containing yttrium (Y) and a halogen element (X) as constituent elements. For example, it is preferred that the halogen element (X) be fluorine, and the inorganic compound include yttrium fluoride. The slurry having such a structure enables the formation of a sprayed coating having excellent plasma erosion resistance especially against halogen plasma.

In the technique disclosed here, the halogen plasma is typically a plasma generated by using a plasma generating gas including a halogen-containing gas (halogenated compound gas). Specific examples of the halogen-containing gas include fluorine-containing gases used, for example, in a dry etching step at the time of production of semiconductor substrates, such as $SF_6$, $CF_4$, $CHF_3$, $ClF_3$, and HF; chlorine-containing gases such as $Cl_2$, $BCl_3$, and HCl; bromine-containing gases such as HBr; and iodine-containing gases such as HI. These gases can be used singly or as a mixture of two or more of them, and the plasma generated by using such a gas can be typically exemplified. Such a gas may be a mixed gas with an inert gas such as argon (Ar).

In a preferred aspect of the slurry for thermal spraying disclosed here, the spray particles include a compound containing yttrium (Y), a halogen element (X), and oxygen (O) as constituent elements. For example, it is preferred that the halogen element (X) be fluorine, and the compound be an yttrium oxyfluoride. The slurry having such a structure enables the formation of a sprayed coating having more excellent plasma erosion resistance. For example, a sprayed coating having novel characteristics due to the yttrium oxyfluoride can be formed.

In a preferred aspect of the slurry for thermal spraying disclosed here, the spray particles include yttrium fluoride and an yttrium oxyfluoride. In the slurry having such a structure, the yttrium oxyfluoride can be appropriately prevented from undergoing oxidative decomposition during thermal spraying, and a sprayed coating having more excellent plasma erosion resistance can be formed.

In a preferred aspect of the slurry for thermal spraying disclosed here, the slurry further includes an agglomerating agent. In the slurry having such a structure, even when the spray particles precipitate, the spray particles can be prevented from forming hard agglomerates. Accordingly, the slurry for thermal spraying having higher dispersion stability of spray particles in the slurry can be provided.

In a preferred aspect of the slurry for thermal spraying disclosed here, it is preferred that the precipitates formed when 700 mL of the slurry for thermal spraying is placed in a cylindrical container having a volume of 1 L and a height of 16.5 cm and is allowed to stand at room temperature for a week disappear by stirring the slurry for thermal spraying in the cylindrical container in the following conditions: at a temperature of 20° C. or more and 30° C. or less, the cylindrical container is placed in such a manner that the central axis is horizontal, and the cylindrical container is rotated around the central axis at a rotation speed of 100 rpm for 30 minutes. When precipitates disappear by such a gentle stirring operation, the redispersibility can be evaluated as good.

In another aspect, the present invention provides a sprayed coating. The sprayed coating includes a thermal spray product of thermal spraying of any of the above slurries for thermal spraying. The sprayed coating can be formed by thermal spraying at high efficiency by using particles for thermal spraying having a comparatively small average particle size, for example. Accordingly, the sprayed coating can be formed as a dense sprayed coating having high adhesiveness and coating strength.

The present invention also provides a method for forming a sprayed coating. In the method for forming a sprayed coating, a slurry for thermal spraying is thermally sprayed to form a sprayed coating. This method enables the formation of a uniform and dense sprayed coating. For example, a sprayed coating having excellent plasma erosion resistance can be produced.

In a preferred aspect of the method for forming a sprayed coating disclosed here, a slurry for thermal spraying containing an organic solvent as the dispersion medium is subjected to plasma spraying to form a sprayed coating. This method enables thermal spraying at a comparatively low temperature at high speed, and enables the formation of a dense sprayed coating while the spray particles are prevented from undergoing oxidation and degradation. Accordingly, a sprayed coating having excellent plasma erosion resistance can be formed.

In a preferred aspect of the method for forming a sprayed coating disclosed here, a slurry for thermal spraying containing water as the dispersion medium is subjected to high velocity flame spraying to form a sprayed coating. This method enables the formation of a sprayed coating having a composition similar to the composition of spray particles while the spray particles are prevented from undergoing oxidation. Accordingly, a sprayed coating having excellent plasma erosion resistance can be formed.

In a preferred aspect of the method for forming a sprayed coating disclosed here, the slurry for thermal spraying is fed to a thermal spraying apparatus by an axial feed system. In this method, the spray particles in the slurry are charged in a thermal spraying heat source in the axis direction, and thus a larger number of spray particles are allowed to contribute to coating formation. Consequently, a sprayed coating can be formed at high thermal spraying efficiency.

The "axial feed system" is a technique of feeding a slurry for thermal spraying from the center of a thermal spraying heat source (for example, plasma arc or flame) in the generation direction of the thermal spraying heat source or in the axis direction of a torch nozzle.

In a preferred aspect of the method for forming a sprayed coating disclosed here, the method includes feeding the slurry for thermal spraying to a thermal spraying apparatus by using two feeders in such a manner that variable periods of feed amounts of the slurry for thermal spraying from the two feeders have opposite phases to each other. According to this method, spray particles having a comparatively large average particle size are further prevented from agglomerating or sedimenting in the slurry, and a uniform slurry can be fed at an almost constant rate. This method enables the formation of a sprayed coating including a coating texture with a few variations, and thus is preferred.

In a preferred aspect of the method for forming a sprayed coating disclosed here, the method includes sending the slurry for thermal spraying from a feeder, once storing the slurry for thermal spraying in a tank just before a thermal spraying apparatus, and feeding the slurry for thermal spraying in the tank to the thermal spraying apparatus by using natural drop. According to this method, the slurry for thermal spraying can be conditioned in a tank just before the thermal spraying apparatus, spray particles having a comparatively large average particle size are prevented from agglomerating or sedimenting in the slurry, and a uniform slurry can be fed at an almost constant rate. This method also enables the formation of a sprayed coating including a coating texture with a few variations, and thus is preferred.

In a preferred aspect of the method for forming a sprayed coating disclosed here, the method includes feeding the slurry for thermal spraying to a thermal spraying apparatus through a conductive tube. According to this method, static electricity can be prevented from generating in the slurry for thermal spraying that is flowing through the conductive tube, and the feed amount of the spray particles is unlikely to vary. This method is thus preferred.

BRIEF DESCRIPTION OF THE DRAWINGS

FIG. 1 is a scanning electron microscope (SEM) image of spray particles in an embodiment.

DESCRIPTION OF THE PREFERRED EMBODIMENTS

Preferred embodiments of the present invention will now be described. Matters not specifically mentioned in the present description but required for carrying out the present invention can be understood and carried out by a person skilled in the art on the basis of teachings on the implementation of the invention described in the present description and common general knowledge in the field at the time of the patent application.

(Slurry for Thermal Spraying)

The slurry for thermal spraying disclosed here can include spray particles and a dispersion medium. The slurry for thermal spraying is prepared by mixing spray particles with a dispersion medium, for example. The mixing may be performed by using a blade type stirrer, a homogenizer, or a mixer. The slurry for thermal spraying is a slurry that forms precipitates, but is so constituted that the precipitates easily disappear (in other words, as to be redispersed). Materials constituting the slurry for thermal spraying will be described hereinafter. Subsequent to the description about materials, a precipitate disappearance test for evaluating the redispersibility of precipitates will be described.

(Spray Particles)

The spray particles contained in the slurry for thermal spraying are characterized by having an average circularity in a plan view of 0.85 or less. Here, the average circularity is an evaluated value of the circularities of spray particles when the spray particles are observed in a plan view. The circularity is an index representing complexity of the surface shape of a spray particle, and is adopted as an index capable of indirectly indicating sphericity, for example. The circularity approaches a value of 1 as a spray particle approaches a spherical shape (in other words, a circular shape in a plan view). When spray particles having an excessively high average circularity precipitate in a slurry for thermal spraying by natural drop, the spray particles may settle to form hard aggregates. In such a case, redispersion of the spray particles is difficult by simple stirring, and such spray particles are unfavorable. On this account, the technique disclosed here uses nonspherical (in other words, noncircular in a plan view) particles having large unevenness on the outer surface as the spray particles as illustrated in FIG. 1. Spray particles having an average circularity of 0.85 or less can be prevented from forming hard aggregates due to the surface unevenness even when the spray particles precipitate in a slurry. Accordingly, the redispersibility of the spray particles is improved after precipitation in a slurry. This achieves a slurry for thermal spraying having excellent redispersibility of spray particles even when the spray particles precipitate.

For example, spray particles including the ceramic or the inorganic compound described later can easily sediment by gravity to form precipitates in a slurry for thermal spraying. Thus, when used, the slurry for thermal spraying is required to be subjected to operations such as stirring in order to redisperse the spray particles that have precipitated. Here, the spray particles used in conventional slurries for thermal spraying have an almost spherical shape, or have an average circularity closer to 1, in order to improve the flowability of the slurry. On this account, a comparatively strong stirring operation is required in order to disperse spray particles that have precipitated in a slurry for thermal spraying. In contrast, in the slurry for thermal spraying disclosed here, the spray particles have such a nonspherical particle shape as described above. Hence, the slurry can be so prepared that precipitates easily disappear by the precipitate disappearance test described later.

The spray particles preferably have an average circularity of 0.6 or more. When the average circularity is 0.6 or more, pores can be prevented from generating in a sprayed coating formed by using the slurry for thermal spraying. In other words, by using spray particles having an average circularity of 0.6 or more and 0.85 or less, a slurry for thermal spraying having excellent redispersibility and capable of forming a dense sprayed coating can be provided. The average circularity is more preferably 0.65 or more and particularly preferably 0.7 or more.

In the present description, the average circularity can be the arithmetic mean value of circularities of 5,000 or more spray particles in a plan view by an image analysis method. The circularity can be determined by the following procedure. Specifically, spray particles are dispersed in a dispersion medium for measurement to prepare a sample for measurement, first. The dispersion medium for measurement may be any medium that can prevent spray particles from agglomerating and can control spray particles in a dispersion state. In the present embodiment, an ion-exchanged water containing 0.1% by mass of polyoxyethylene sorbitan monolaurate as a surfactant was used as the dispersion medium for measurement. The proportion of spray particles in the measurement sample was 30% by mass or less (in the present embodiment, 30% by mass). The measurement sample prepared in this manner is poured into a glass cell or the like, and thus a flat sample flow in which the spray particles are prevented from overlapping is formed. To the sample flow, flash light is applied to capture an image, and thus a static image of flowing spray particles suspended in the measurement sample is recorded. The obtained static image of the spray particles is subjected to image analysis, and the circularity is calculated. The circularity is defined by the equation: (circularity)=(the perimeter of a circle having the same area as that of a spray particle image)/(the perimeter of the particle image). In other words, the circularity is calculated from a projected area and a perimeter of a spray particle. The circularities of 5,000 or more spray particles are determined, and the arithmetic mean value thereof is calculated as the average circularity. In the present description, the above average circularity is a value calculated by using a flow particle image analyzer (manufactured by Sysmex Corporation, FPIA-2100).

The spray particles may have any composition. For example, the spray particles maybe particles (optionally in a powder form) including various materials including various metals, ceramics, and inorganic compounds. From the viewpoint of forming a sprayed coating having excellent plasma erosion resistance, the spray particles preferably include at least one type of ceramics and inorganic compounds.

The ceramic is not limited to particular ceramics. The ceramic can be exemplified by oxide ceramics including various metal oxides, carbide ceramics including metal carbides, nitride ceramics including metal nitrides, and nonoxide ceramics including nonoxides such as metal borides, metal fluorides, metal hydroxides, metal carbonates, and metal phosphates.

The oxide ceramic is not limited to particular ceramics, and various metal oxides can be used. Examples of the metallic element constituting such an oxide ceramic include metalloid elements such as B, Si, Ge, Sb, and Bi; typical metal elements such as Na, Mg, Ca, Sr, Ba, Zn, Al, Ga, In, Sn, Pb, and P; transition metal elements such as Sc, Y, Ti, Zr, Hf, V, Nb, Ta, Cr, Mo, W, Mn, Fe, Co, Ni, Cu, Ag, and Au; and lanthanoid elements such as La, Ce, Pr, Nd, Pm, Sm, Eu, Gd, Tb, Dy, Ho, Er, Tu, Yb, and Lu. These elements can be used singly or in combination of two or more of them. Specifically preferred are one or more elements selected from Mg, Y, Ti, Zr, Cr, Mn, Fe, Zn, Al, and Er. The oxide ceramic disclosed here also preferably contains, in addition to the above metallic element, a halogen element such as F, Cl, Br, and I.

More specifically, examples of the oxide ceramic include alumina, zirconia, yttria, chromia, titania, cobaltite, magnesia, silica, calcia, ceria, ferrite, spinel, zircon, forsterite, steatite, cordierite, mullite, nickel oxide, silver oxide, copper oxide, zinc oxide, gallium oxide, strontium oxide, scandium oxide, samarium oxide, bismuth oxide, lanthanum oxide, lutetium oxide, hafnium oxide, vanadium oxide, niobium oxide, tungsten oxide, manganese oxide, tantalum oxide, terbium oxide, europium oxide, neodymium oxide, tin oxide, antimony oxide, antimony-containing tin oxide, indium oxide, barium titanate, lead titanate, lead zirconate titanate, Mn—Zn ferrite, Ni—Zn ferrite, sialon, tin-containing indium oxide, zirconium oxide aluminate, zirconium oxide silicate, hafnium oxide aluminate, hafnium oxide silicate, titanium oxide silicate, lanthanum oxide silicate, lanthanum oxide aluminate, yttrium oxide silicate, titanium oxide silicate, tantalum oxide silicate, yttrium oxyfluoride, yttrium oxychloride, yttrium oxybromide, and yttrium oxyiodide.

Examples of the nonoxide ceramic include carbide ceramics such as tungsten carbide, chromium carbide, niobium carbide, vanadium carbide, tantalum carbide, titanium carbide, zirconium carbide, hafnium carbide, silicon carbide, and boron carbide; nitride ceramics such as silicon nitride and aluminum nitride; boride ceramics such as hafnium boride, zirconium boride, tantalum boride, and titanium boride; hydroxide ceramics such as hydroxyapatite; and phosphoric acid ceramics such as calcium phosphate.

The inorganic compound is not limited to particular compounds, and can be exemplified by semiconductors such as silicon, and particles (optionally powders) of inorganic compounds such as various carbides, nitrides, and borides. The inorganic compound may be a crystalline compound or an amorphous compound. Specifically preferred examples of the inorganic compound include quartz glass mainly containing $SiO_2$, various glass compositions prepared by adding an element such as boron (B), phosphorus (P), and fluorine (F) to the quartz glass, and halides of rare earth elements containing a rare earth element (RE) and a halogen element (X). The rare earth halide can form a sprayed coating having excellent plasma erosion resistance, for example. Thus, in a slurry for thermal spraying used for forming a protective coating on a member in a semiconductor device production apparatuses, the spray particles preferably contain a rare earth halide.

In the rare earth halide, the rare earth element (RE) is not limited to particular rare earth elements and can be appropriately selected from scandium, yttrium, and lanthanoid elements. Specifically, the rare earth element is exemplified by scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). These elements may be used singly or in combination of two or more of them.

Preferred examples include Y, La, Gd, Tb, Eu, Yb, Dy, and Ce from the viewpoint of improving the plasma erosion resistance or relatively inexpensive, for example. Of them, Y is preferably contained. These rare earth elements may be contained singly or in combination of two or more of them.

The halogen element (X) is also not limited to particular elements and may be any element belonging to Group 17 in the periodic table. Specifically, halogen elements such as fluorine (F), chlorine (Cl), bromine (Br), iodine (I), and astatine (At) may be used singly or in combination of two or more of them. The halogen element is preferably F, Cl, or Br. These halogen elements may be contained singly or in combination of two or more of them. Such a rare earth halide is preferably an yttrium halide typified by yttrium fluoride ($YF_3$), yttrium chloride ($YCl_3$), and yttrium bromide ($YBr_3$). Fluorides of various rare earth elements, typified by yttrium fluoride, are exemplified as preferred examples.

The spray particles disclosed here preferably include spray particles including an yttrium oxyfluoride among the above ceramics and inorganic compounds. The yttrium oxyfluoride can also form a sprayed coating having excellent plasma erosion resistance, for example, and thus is preferred. The yttrium oxyfluoride is preferred in terms of capable of forming a sprayed coating having excellent plasma erosion resistance especially against halogen plasma. The yttrium oxyfluoride can be a compound containing at least yttrium (Y), oxygen (O), and fluorine (F) as constituent elements. The ratio of yttrium (Y), oxygen (O), and fluorine (F) constituting the yttrium oxyfluoride is not limited to particular values.

For example, the molar ratio of fluorine to oxygen (F/O) is not limited to particular values. As a preferred example, the molar ratio (F/O) can be 1, for example, and is preferably more than 1. Specifically, for example, the molar ratio is preferably 1.2 or more, more preferably 1.3 or more, and particularly preferably 1.4 or more. The upper limit of the molar ratio (F/O) is not limited to particular values and can be 3 or less, for example. As a more preferred example, the molar ratio of fluorine to oxygen (F/O) is, for example, 1.3 or more and 1.53 or less (for example, 1.4 or more and 1.52 or less), 1.55 or more and 1.68 or less (for example, 1.58 or more and 1.65 or less), or 1.7 or more and 1.8 or less (for example, 1.72 or more and 1.78 or less). In such a condition, thermal stability can be improved at the time of thermal spraying, and thus such a ratio is preferred. When spray particles have such a higher ratio of fluorine to oxygen, a sprayed coating as a thermal spray product of the slurry for thermal spraying can obtain excellent erosion resistance against halogen plasma, and thus such spray particles are preferred.

The molar ratio of yttrium to oxygen (Y/O) is not limited to particular values. As a preferred example, the molar ratio (Y/O) can be 1 and is preferably more than 1. Specifically, for example, the molar ratio is preferably 1.05 or more, more preferably 1.1 or more, and particularly preferably 1.15 or more. The upper limit of the molar ratio (Y/O) is not limited to particular values and can be 1.5 or less, for example. As a more preferred example, the molar ratio of yttrium to oxygen (Y/O) is, for example, 1.1 or more and 1.18 or less (for example, 1.12 or more and 1.17 or less), 1.18 or more and 1.22 or less (for example, 1.19 or more and 1.21 or less), or 1.22 or more and 1.3 or less (for example, 1.23 or more and 1.27 or less). In such a condition, thermal stability can be improved at the time of thermal spraying, and thus such a ratio is preferred. When a slurry for thermal spraying containing spray particles having such a small ratio of oxygen to yttrium is thermally sprayed, the spray particles can be prevented from undergoing oxidative decomposition, and thus such spray particles are preferred. For example, in a sprayed coating as a thermal spray product of the slurry for thermal spraying, the formation of yttrium oxides (for example, $Y_2O_3$) by oxidation of an yttrium component can be suppressed, and thus such spray particles are preferred.

More specifically, the yttrium oxyfluoride may be a compound represented by YOF as the chemical composition where the ratio of yttrium, oxygen, and fluorine is 1:1:1. The yttrium oxyfluoride may also be $Y_5O_4F_7$, $Y_6O_5F_8$, $Y_7O_6F_9$, $Y_{17}O_{14}F_{23}$, and the like represented by the general formula: $Y_1O_{1-n}F_{1+2n}$ (where n satisfies $0.12 \leq n \leq 0.22$, for example). In particular, $Y_5O_4F_7$, $Y_6O_5F_8$, $Y_7O_6F_9$, and the like in which the molar ratios (Y/O) and (F/O) are within the above preferred ranges can form a denser sprayed coating having higher hardness and having excellent plasma erosion resistance against halogen gas plasma, and thus are preferred. Such an yttrium oxyfluoride may include a monophase of any one of the compounds or may include a mixed phase, a solid solution, or a compound of two or more compounds in combination or a mixture of them.

The slurry for thermal spraying disclosed here may contain spray particles including other ceramics, inorganic compounds, metals, or cermets in addition to the spray particles including the yttrium oxyfluoride. However, for example, in the slurry for thermal spraying used for forming a sprayed coating having excellent plasma erosion resistance, the spray particles preferably contain a larger amount of the yttrium oxyfluoride. The yttrium oxyhalide is preferably contained in the spray particles at a high proportion of 77% by mass or more. The yttrium oxyfluoride has much higher plasma erosion resistance than that of yttrium oxide ($Y_2O_3$) that has been known as a material having high plasma erosion resistance. When contained even in a small amount, the yttrium oxyfluoride greatly improves the plasma erosion resistance. When contained in such a large amount as described above, the yttrium oxyfluoride can achieve extremely excellent plasma resistance. Such a condition is therefore preferred. The proportion of the yttrium oxyfluoride is more preferably 80% by mass or more (more than 80% by mass), even more preferably 85% by mass or more (more than 85% by mass), further preferably 90% by mass or more (more than 90% by mass), and further more preferably 95% by mass or more (more than 95% by mass). For example, the proportion is particularly preferably, substantially 100% by mass (100% except unavoidable impurities). When containing the yttrium oxyfluoride at such a high proportion, the spray particles can contain other substances that are likely to become particles (fine pieces, foreign substances) at the time of exposure to plasma.

When spray particles contain the yttrium oxyfluoride, the whole spray particles can include the yttrium oxyfluoride in a preferred embodiment. However, when containing a composition comparatively susceptible to oxidation (for example, $Y_1O_1F_1$) of the yttrium oxyfluorides, the spray particles preferably contain a halide of a rare earth element at a proportion of 23% by mass or less, for example. The rare earth halide contained in spray particles can be oxidized during thermal spraying to form an oxide of the rare earth element in a sprayed coating. For example, yttrium fluoride can be oxidized during thermal spraying to form yttrium oxide in a sprayed coating. The yttrium oxide can become the generation source of fine particles that did not cause problems before in an environment exposed to halogen plasma. Meanwhile, an yttrium oxyfluoride (for example, $Y_1O_1F_1$) can also be oxidized during thermal spraying to form yttrium oxide in a sprayed coating. At this time, when the yttrium oxyfluoride is present together with a small amount of a rare earth halide, the oxidation of the yttrium oxyfluoride can be suppressed by the rare earth halide, and thus the coexistence is preferred. However, an excess proportion of a rare earth halide results in an increase of the particle source as described above, and thus a proportion of more than 23% by mass is unfavorable because the plasma erosion resistance is deteriorated. From such a viewpoint, the proportion of the rare earth halide is preferably 20% by mass or less, more preferably 15% by mass or less, even more preferably 10% by mass or less, and, for example, preferably 5% by mass or less. In a preferred embodiment of the material for thermal spraying disclosed here, substantially no rare earth halide (for example, yttrium fluoride) can be contained.

The yttrium halide and the yttrium oxyhalide have been described with reference to the case in which the halogen element is fluorine as an example. However, compounds including a halogen element except fluorine can have crystal structures identical or similar to those of the above compounds, and also have similar properties. A person skilled in the art therefore can understand that a compound prepared by replacing some or all of the fluorines (F) in the above explanation with any halogen element achieves similar functions.

Detailed compositions and the ratio of an yttrium halide and/or an yttrium oxyhalide contained in the spray particles is not limited to particular compositions and ratios. For example, all the spray particles may be an yttrium halide or may be an yttrium oxyhalide. Alternatively, the spray particles may be a mixture of them at any ratio.

Spray particles including yttrium oxide ($Y_2O_3$) form a white sprayed coating and can be a preferred material in order to form a sprayed coating having environmental barrier properties or erosion resistance against typical plasma. Spray particles can also be so constituted as to contain substantially no oxide of yttrium (yttrium oxide: $Y_2O_3$) component so that a sprayed coating as a thermal spray product can achieve plasma resistance at a higher level. For example, the slurry for thermal spraying containing spray particles including the yttrium oxyfluoride preferably contains no spray particles including yttrium oxide. Yttrium oxide included in spray particles can remain as yttrium oxide in a sprayed coating formed by thermal spraying. The yttrium oxide has extremely low plasma resistance as compared with yttrium oxyfluorides and rare earth halides, for example, as described above. Hence, an area containing yttrium oxide is likely to form a brittle altered layer when exposed to a plasma environment, and the altered layer is likely to generate extremely fine particles and to be released. The fine particles may deposit on a semiconductor substrate. On this account, in the slurry for thermal spraying disclosed here, yttrium oxide, which can become a particle source, is preferably excluded.

In the present description, "containing substantially no component" means that the proportion of the component (here, yttrium oxide) is 5% by mass or less, preferably 3% by mass or less, and, for example, 1% by mass or less. Such a structure can be ascertained by that diffraction peaks based on the component are not detected in X-ray diffraction analysis of the spray particles, for example.

When spray particles contain multiple (for example, a, where a is a natural number and $a \geq 2$) compositions of yttrium oxyfluorides and/or rare earth halides, the proportion of each composition can be calculated by the following procedure. First, the compositions of compounds constituting spray particles are identified by X-ray diffraction analysis. In this analysis, valence numbers (element ratio) of the yttrium oxyfluoride are needed to be identified.

For example, when a single type of yttrium oxyfluoride is present and the remaining is $YF_3$ in a material for thermal spraying, the oxygen content in the material for thermal spraying is determined with, for example, an oxygen/nitrogen/hydrogen analyzer (for example, manufactured by LECO, ONH836). From the obtained oxygen concentration, the content of the yttrium oxyfluoride can be quantitatively determined.

When two or more types of yttrium oxyfluorides are present or an oxygen-containing compound such as yttrium oxide is mixed, the proportion of each compound can be quantitatively determined by a calibration curve method, for example. Specifically, several samples are prepared by changing the proportion of each compound, and each sample is subjected to X-ray diffraction analysis. A calibration curve indicating the relation between a main peak intensity and the content of a corresponding compound is prepared. On the basis of the calibration curve, the content is quantitatively determined from the main peak intensities of yttrium oxyfluorides in XRD of a material for thermal spraying to be measured.

As for the molar ratio (F/O) and the molar ratio (Y/O) in the above yttrium oxyfluoride, the molar ratio (Fa/Oa) and the molar ratio (Ya/Oa) of each composition are calculated, then the molar ratio (Fa/Oa) and the molar ratio (Ya/Oa) are multiplied by the abundance ratio of the corresponding composition, and the results are summed up (the weighted sum is calculated), thereby enabling the calculation of the molar ratio (F/O) and the molar ratio (Y/O) of all the yttrium oxyhalides in spray particles.

The materials constituting the spray particles may include other elements in addition to the above exemplified elements, in order to improve functionalities, for example. Each of the ceramic and the inorganic compound may be a mixture or a composite including two or more compositions.

The spray particles may be any particles that have an average particle size of about 30 μm or less, and the lower limit of the average particle size is also not limited to particular values. Here, spray particles having a comparatively small average particle size are preferably used in the slurry for thermal spraying disclosed here because the improvement effect of the feeding performance is obvious. From such a viewpoint, the average particle size of the spray particles can be, for example, 8 μm or less and can be preferably 6 μm or less, more preferably 5 μm or less, and, for example, 3 μm or less. The lower limit of the average particle size is not limited to particular values, but can be, for example, 0.1 μm or more and can be preferably 0.2 μm or more, more preferably 0.5 μm or more, and, for example, 1 μm or more, in consideration of the viscosity or flowability of the slurry for thermal spraying.

For example, when fine spray particles having an average particle size of about 8 μm or less are used as the thermal spraying material, the specific surface area is increased, and accordingly the flowability can be reduced, typically. Such a thermal spraying material thus has poor feeding performance to a thermal spraying apparatus, and the thermal spraying material adheres to a feed line, for example, and is difficult to feed to a thermal spraying apparatus. Hence, the coating formability may deteriorate. In addition, such a thermal spraying material has a small mass, thus can be hit by a thermal spraying flame or a jet stream, and can be difficult to fly appropriately. In contrast, in the slurry for thermal spraying disclosed here, for example, spray particles even having an average particle size of 8 μm or less are prepared as a slurry in consideration of feeding performance to a thermal spraying apparatus. Thus, the slurry is prevented from adhering to a feed line or the like and can maintain high coating formability. In addition, the particles are fed to a flame or a jet stream in a slurry state, thus are not hit by the flame or the jet, and can fly with the stream. Moreover, a dispersion medium is removed during flying. Hence, the thermal spraying efficiency is maintained at a higher level, and a sprayed coating can be formed.

For particles with an average particle size of about 1 μm or more, the average particle size of the spray particles can be a 50% cumulative particle size ($D_{50}$) in volumetric particle size distribution determined by using a laser diffraction/scattering particle size distribution analyzer (manufactured by Horiba, Ltd., LA-950). Concurrently with the measurement of the average particle size, the 3% cumulative particle size ($D_3$) and the 97% cumulative particle size ($D_{97}$) in volumetric particle size distribution of spray particles can be calculated.

For particles with an average particle size of less than about 1 μm, the sphere equivalent diameter calculated on the basis of a specific surface area can be adopted. The specific surface area can be a value calculated by a single point BET method from the adsorption amount of a gas such as $N_2$ determined by a continuous flow method by using a specific surface area analyzer (manufactured by Micromeritics, FlowSorbil 2300). The critical values of average particle sizes determined by the respective measurement methods are not strictly specified, and can be changed according to the accuracy of an analyzer used, for example.

(Dispersion Medium)

As the dispersion medium, any of aqueous dispersion media and nonaqueous dispersion media can be used.

As the aqueous dispersion medium, water or a mixture of water and a water-soluble organic solvent (mixed aqueous solution) can be used. As the water, tap water, ion-exchanged water (deionized water), distilled water, and pure water can be used, for example. As the organic solvent except water constituting the mixed aqueous solution, one or more of organic solvents that are homogeneously miscible with water (for example, lower alcohols and lower ketones having 1 to 4 carbon atoms) can be appropriately selected and used. For example, organic solvents such as methanol, ethanol, n-propyl alcohol, and isopropyl alcohol are exemplified as preferred examples. As the aqueous dispersion medium, for example, water or a mixed aqueous solution containing water at 80% by mass or more (more preferably 90% by mass or more, even more preferably 95% by mass or more) in the aqueous dispersion medium is preferably used. Specifically preferred examples can be aqueous dispersion media substantially including water (for example, tap water, distilled water, pure water, and purified water).

As the nonaqueous dispersion medium, organic solvents containing no water are typically exemplified. Such an organic solvent is not limited to particular solvents, and is exemplified by alcohols such as methanol, ethanol, n-propyl alcohol, and isopropyl alcohol; and organic solvents such as toluene, hexane, and kerosene. These solvents can be used singly or in combination of two or more of them.

The type and the composition of the dispersion medium to be used can be appropriately selected according to a thermal spray method of the slurry for thermal spraying, for example. In other words, for example, when the slurry for thermal spraying is thermally sprayed by a high velocity flame spraying method, any of the aqueous dispersion media and the nonaqueous dispersion media can be used. When an aqueous dispersion medium is used, the surface roughness of a resulting sprayed coating is improved (a smoother surface) as compared with the case using a nonaqueous dispersion medium, and this is advantageous. When a nonaqueous dispersion medium is used, a resulting sprayed coating has a lower porosity as compared with the case using an aqueous dispersion medium, and this is advantageous.

The type of a dispersion medium to be used can be appropriately selected according to the solubility of spray particles and a thermal spray method of the slurry for thermal spraying. For example, when the slurry for thermal spraying is subjected to high velocity flame spraying, an aqueous dispersion medium is preferably used. When the slurry for thermal spraying is subjected to plasma spraying, a nonaqueous dispersion medium is preferably used. For plasma spraying, an aqueous dispersion medium can also be used alternatively.

The content of spray particles in the slurry for thermal spraying, or the solid content concentration is preferably 10% by mass or more, more preferably 20% by mass or more, and even more preferably 30% by mass or more. In this case, the thickness of a sprayed coating produced from the slurry for thermal spraying per unit time can be increased. In other words, the thermal spraying efficiency can be easily improved.

The content of spray particles in the slurry for thermal spraying is also preferably 85% by mass or less, more preferably 70% by mass or less, and even more preferably 50% by mass or less. In this case, a slurry for thermal spraying having an intended flowability suited for satisfactory feeding to a thermal spraying apparatus, or a slurry for thermal spraying having an intended flowability sufficient for the formation of a sprayed coating can be easily produced.

(Agglomerating Agent)

The slurry for thermal spraying may further contain an agglomerating agent as needed. Here, the agglomerating agent is a compound capable of agglomerating spray particles in the slurry for thermal spraying. Typically, the agglomerating agent is a compound capable of flocculating spray particles in the slurry for thermal spraying. Depending on physical properties of spray particles, when the slurry for thermal spraying contains an agglomerating agent (including a redispersibility improvement agent, a caking inhibitor, and the like), spray particles precipitate while the agglomerating agent is interposed between the spray particles, thus the spray particles that have precipitated are prevented from aggregating (particles are prevented from tightly aggregating and depositing), and the redispersibility is improved. In other words, even when spray particles precipitate, the respective particles are prevented from densely agglomerating (or aggregating) (also called caking or hard-caking). The agglomerating agent is particularly preferably contained in a slurry for thermal spraying containing spray particles that have an average particle size of 200 nm or more and are likely to sediment. In other words, spray particles that have precipitated are easily redispersed by an operation such as stirring, and thus the operation for redispersion is simplified. The agglomerating agent may be any of aluminum-containing compounds, iron-containing compounds, phosphoric acid-containing compounds, and organic compounds. Examples of the aluminum-containing compound include aluminum sulfate, aluminum chloride, and polyaluminum chloride (also called PAC and PAC1). Examples of the iron-containing compound include ferric chloride and polyferric sulfate. Examples of the phosphoric acid-containing compound include sodium pyrophosphate. Examples of the organic compound include organic acids such as malic acid, succinic acid, citric acid, maleic acid, and maleic anhydride, diallyldimethylammonium chloride polymers, lauryltrimethylammonium chloride, naphthalenesulfonic acid condensates, sodium triisopropylnaphthalenesulfonate, sodium polystyrene sulfonate, isobutylene-maleic acid copolymers, and carboxyvinyl polymers.

As apparent from the description, for example, the concept of "aluminum-containing compounds" in the present description encompasses compounds containing an aluminum element, salts thereof, and derivatives thereof. The same applies to the other compounds.

The content of the agglomerating agent varies with the composition (physical properties) of spray particles and the like, and thus is not necessarily limited, but is typically, roughly within a range from 0.1 to 2% by mass where the mass of spray particles is 100% by mass.

(Dispersant)

The slurry for thermal spraying may further contain a dispersant as needed. Here, the dispersant is a compound capable of improving the dispersion stability of spray particles in the slurry for thermal spraying. Such a dispersant can be a compound that essentially affects spray particles or can be a compound that affects a dispersion medium, for example. The dispersant can also be a compound that affects spray particles or a dispersion medium to improve the surface wettability of the spray particles, a compound that deflocculates spray particles, or a compound that suppresses or prevents reagglomeration of deflocculated spray particles, for example.

The dispersant can be appropriately selected from aqueous dispersants and nonaqueous dispersants according to the above dispersion medium, and used. Such a dispersant may be any of polymer dispersants, surfactant-type dispersants (also called low molecular dispersants), and inorganic dispersants, and these dispersants may be any of anionic dispersants, cationic dispersants, and nonionic dispersants. In other words, the dispersant can have at least one functional group of anionic groups, cationic groups, and nonionic groups in the molecular structure thereof.

Examples of the aqueous polymer dispersant include dispersants including polycarboxylic acid compounds such as sodium polycarboxylate, ammonium polycarboxylate, and polycarboxylic acid polymers; dispersants including sulfonic acid compounds such as sodium polystyrene sulfonate, ammonium polystyrene sulfonate, sodium polyisoprene sulfonate, ammonium polyisoprene sulfonate, sodium naphthalenesulfonate, ammonium naphthalenesulfonate, sodium salts of naphthalenesulfonic acid formalin condensates, and ammonium salts of naphthalenesulfonic acid formalin condensates; and dispersants including polyethylene glycol compounds. Examples of the nonaqueous polymer dispersant include dispersants including acrylic compounds such as polyacrylates, polymethacrylates, polyacrylamide, and polymethacrylamide; dispersants including polycarboxylic acid partial alkyl ester compounds that are polycarboxylic acids partially having alkyl ester bonds; dispersants including polyether compounds; and dispersants including polyalkylene polyamine compounds.

Examples of the aqueous surfactant-type dispersant (also called low molecular dispersant) include dispersants including alkylsulfonic acid compounds, dispersants including quaternary ammonium compounds, and dispersants including alkylene oxide compounds. Examples of the nonaqueous surfactant-type dispersant include dispersants including polyhydric alcohol ester compounds, dispersants including alkyl polyamine compounds, and dispersants including imidazoline compounds such as alkyl imidazolines.

Examples of the aqueous inorganic dispersant include phosphates such as orthophosphates, metaphosphates, polyphosphates, pyrophosphates, tripolyphosphates, hexametaphosphates, and organic phosphates; iron salts such as ferric sulfate, ferrous sulfate, ferric chloride, and ferrous chloride; aluminum salts such as aluminum sulfate, polyaluminum chloride, and sodium aluminate; and calcium salts such as calcium sulfate, calcium hydroxide, and dibasic calcium phosphate.

The above dispersants may be used singly or in combination of two or more of them. In the technique disclosed here, an alkyl imidazoline compound-containing dispersant and a dispersant including a polyacrylic acid compound are preferably used in combination as a specific example. The content of the dispersant varies with the composition (physical properties) and the like of spray particles, and thus is not necessarily limited, but is typically, roughly within a range from about 0.01 to 2% by mass where the mass of spray particles is 100% by mass. A compound classified into one of the aqueous dispersant and the nonaqueous dispersant for convenience can be used as the other of the nonaqueous dispersant and the aqueous dispersant depending on the detailed chemical structure or the usage conditions thereof.

(Viscosity Modifier)

The slurry for thermal spraying may further contain a viscosity modifier as needed. Here, the viscosity modifier is a compound capable of reducing or increasing the viscosity of a slurry for thermal spraying. By appropriately adjusting the viscosity of a slurry for thermal spraying, a reduction in the flowability of the slurry for thermal spraying can be suppressed even when the content of spray particles in the slurry for thermal spraying is comparatively high. Examples of the compound usable as the viscosity modifier include nonionic polymers including polyethers such as polyethylene glycol and cellulose derivatives such as carboxymethylcellulose (CMC) and hydroxyethylcellulose (HEC).

(Antifoaming Agent)

The slurry for thermal spraying may further contain an antifoaming agent as needed. Here, the antifoaming agent is a compound capable of preventing foam from generating in a slurry for thermal spraying at the time of production of a slurry for thermal spraying or thermal spraying or is a compound capable of eliminating foam generated in a slurry for thermal spraying. Examples of the antifoaming agent include silicone oil, silicone emulsion antifoaming agents, polyether antifoaming agents, and fatty acid ester antifoaming agents.

(Antiseptic, Fungicide)

The slurry for thermal spraying may further contain an antiseptic or a fungicide as needed. Examples of the antiseptic or the fungicide include isothiazoline compounds, azole compounds, and propylene glycol.

When the above additives such as the agglomerating agent, the dispersant, the viscosity modifier, the antifoaming agent, the antiseptic, and the fungicide is used, any one of them can be used, or two or more of them can be used in combination. Such an additive can be added to a dispersion medium concurrently with spray particles or can be added separately, at the time of the preparation of the slurry for thermal spraying.

The above compounds exemplified as various additives can exhibit functions as other additives in addition to a principal purpose thereof. In other words, for example, a compound of the same type or a compound having the same composition can exhibit functions as two or more additives.

The pH of the slurry for thermal spraying is not limited to particular values, but is preferably 2 or more and 12 or less. In terms of easy handling of the slurry for thermal spraying, the pH is preferably 6 or more, more preferably 7 or more, and particularly preferably 8 or more. The pH is preferably 11 or less, more preferably 10.5 or less, and particularly preferably 10 or less. From the viewpoint of controlling the agglomerating properties of spray particles, the pH may be adjusted to a value out of the above preferred range. The pH of the slurry for thermal spraying can be controlled by known various acids, bases, or salts thereof. Specifically, organic acids such as carboxylic acid, organic phosphonic acids, and organic sulfonic acids; inorganic acids such as phosphoric acid, phosphorous acid, sulfuric acid, nitric acid, hydrochloric acid, boric acid, and carbonic acid; organic bases such as tetramethylammonium hydroxide, trimethanolamine, and monoethanolamine; inorganic bases such as potassium hydroxide, sodium hydroxide, and ammonia; and salts thereof are preferably used.

The pH of a slurry for thermal spraying can be a value determined by using a glass electrode pH meter (for example, manufactured by Horiba, Ltd., Benchtop pH meter (F-72)) with pH standard solutions (for example, a phthalate pH standard solution (pH: 4.005/25° C.), a neutral phosphate pH standard solution (pH: 6.865/25° C.), and a carbonate pH standard solution (pH: 10.012/25° C.)) in accordance with JIS Z8802: 2011.

The absolute value of the zeta potential of the spray particles in a slurry for thermal spraying is preferably 10 mV or more, more preferably 25 mV or more, and particularly preferably 40 mV or more. The upper limit of the absolute value of the zeta potential is not limited to particular values, but is preferably 500 mV or less, for example. By adjusting the absolute value of the zeta potential in a slurry for thermal spraying to such a value, the dispersion stability of the spray particles in a slurry for thermal spraying can be controlled. The zeta potential of spray particles can be a value determined without any pretreatment such as dilution of a slurry for thermal spraying to be measured. The measurement method of the zeta potential can be a known measurement technique such as a microscope electrophoresis method, a rotational diffraction grating method, a laser doppler electrophoresis method, an ultrasonic vibration potential method, and an electrokinetic sonic amplitude method. Of them, the ultrasonic vibration potential method that can determine the zeta potential of spray particles in a high-concentration thermal spraying slurry can be preferably adopted because ultrasonic waves are applied to vibrate the spray particles in a thermal spraying slurry and the zeta potential is measured. In the present description, the zeta potential is a value determined by using an ultrasonic particle size distribution/zeta potential analyzer (manufactured by Dispersion Technology, DT-1200).

The sedimentation rate of the spray particles in a slurry for thermal spraying indicates the speed of the spray particles that sediment in the slurry for thermal spraying. The sedimentation rate can be used as an index indicating sedimentation properties of spray particles and can also be used as an index indicating the degree of dispersion stability. The sedimentation rate is, but is not necessarily limited to, preferably 30 μm/sec or more, more preferably 35 μm/sec or more, and even more preferably 40 μm/sec or more. The spray particles in a slurry for thermal spraying may maintain a dispersion state without sedimentation, but a slurry for thermal spraying containing spray particles that are more likely to precipitate is preferred because the advantageous effects of the technique disclosed here are more obvious.

From such a viewpoint, the technique disclosed here can be preferably applied to a slurry for thermal spraying having a spray particle sedimentation rate of about 70 μm/sec or less, for example.

The sedimentation rate of the spray particles in a slurry for thermal spraying can be a value determined by measuring all the spray particles in accordance with the centrifugal liquid sedimentation method (JIS Z8823-1: 2001). The sedimentation rate can be a value determined by a centrifuge sedimentation/light transmission method with a particle size distribution/dispersion stability analyzer (manufactured by L. U. M. GmbH, LUMiSizer 610) at a rotation rate of 920 rpm (100 G), for example.

The slurry for thermal spraying preferably has a viscosity of 3,000 mPa·s or less, more preferably 1,000 mPa·s or less, even more preferably 500 mPa·s or less, and most preferably 300 mPa·s or less (for example, 100 mPa·s or less). As the viscosity is reduced, a slurry for thermal spraying having an intended flowability sufficient for the formation of a sprayed coating is easily produced.

The viscosity of a slurry for thermal spraying is a viscosity at room temperature (25° C.) determined by using a rotational viscometer. Such a viscosity can be a value determined by using a Brookfield rotational viscometer (for example, manufactured by Rion, Viscotester VT-03F), for example.

(Precipitate Disappearance Test)

The slurry for thermal spraying described above is so controlled that spray particles that have precipitated are disappear easily. The redispersibility of the spray particles that have precipitated can be evaluated by the precipitate disappearance test disclosed here, for example.

The precipitate disappearance test can be performed by the following procedure. In other words, 700 mL of a slurry for thermal spraying is first placed in a cylindrical container having a volume of 1 L and a height of 16.5 cm (an inner diameter of about 4.4 cm) and is allowed to stand at room temperature for a week. The spray particles contained in the slurry for thermal spraying sediment in the dispersion medium and are separated from the dispersion medium, giving precipitates. At a temperature of 20° C. or more and 30° C. or less, the slurry for thermal spraying in a state in which the precipitates are formed is placed in such a manner that the central axis of the cylindrical container is horizontal, and then the cylindrical container is rotated around the central axis. The rotation conditions are a rotation speed of 100 rpm and a rotation time of 30 minutes. For the rotation, the cylindrical container may be installed on a rotary roller or the like and may be rolled around the central axis on the roller. Disappearance of the precipitates can be ascertained by visual observation of the slurry for thermal spraying after stirring. A slurry for thermal spraying in which precipitates disappear by the precipitate disappearance test can be evaluated to have high redispersibility even when precipitates are formed. A sufficient redispersion state of spray particles can be maintained by pulsation of a slurry for thermal spraying when the slurry for thermal spraying is transferred to a thermal spraying apparatus. Hence, a slurry for thermal spraying capable of forming a good quality sprayed coating can be provided.

As described above, the slurry for thermal spraying disclosed here contains spray particles with good dispersibility and accordingly can be prepared as a slurry with good redispersibility. Thus, the whole slurry for thermal spraying can be provided in such a way as to be divided into two or more packages, and the packages can be combined before thermal spraying (actual use), for example. For example, the slurry for thermal spraying can be provided in such a way that a slurry in which particles for thermal spraying have precipitated is divided into a portion that does not contain the particles for thermal spraying or contains the particles in a smaller amount (typically, a supernatant liquid portion) and a portion that contains all the particles for thermal spraying or contains the particles in a larger amount (typically, a remainder portion after removal of the supernatant liquid portion). For actual use, the divided portions can be appropriately mixed and stirred, and the resulting mixture can be used as the slurry for thermal spraying. Alternatively, the slurry for thermal spraying can be provided in such a way that components except the dispersion medium are packed in one or more packages separately from the dispersion medium. Also in this case, for actual use, the components except the dispersion medium can be mixed with the dispersion medium, and the slurry for thermal spraying can be prepared. This embodiment enables simple preparation of a slurry for thermal spraying even immediately before thermal spraying. This embodiment also has an advantage of easy storage until use for thermal spraying.

(Method for Forming Sprayed Coating)

(Substrate)

In the method for forming a sprayed coating disclosed here, the substrate on which a sprayed coating is formed by thermal spraying is not limited to particular substrates. For example, any substrate made from various materials can be used as long as the substrate is made from a material that can have an intended resistance when the substrate is subjected to the thermal spraying. Examples of such a material include various metals and alloys. Such a material is specifically exemplified by aluminum, aluminum alloys, iron, steel, copper, copper alloys, nickel, nickel alloys, gold, silver, bismuth, manganese, zinc, and zinc alloys. Of them, substrates made of steels typified by various SUS materials having comparatively high thermal expansion coefficients in general purpose metal materials (optionally what is called stainless steel), heat-resistant alloys typified by inconel, low-expansion alloys typified by invar and kovar, corrosion-resistant alloys typified by hastelloy, and aluminum alloys typified by 1,000 series to 7,000 series aluminum alloys that are useful as lightweight structural materials and the like are exemplified.

(Coating Formation Method)

The slurry for thermal spraying disclosed here can be subjected to a thermal spraying apparatus based on a known thermal spraying method and thus can be used as the material for thermal spraying in order to form a sprayed coating. As the thermal spray method of appropriately, thermally spraying the slurry for thermal spraying, a thermal spray method such as plasma spraying and high velocity flame spraying can be adopted, for example.

The plasma spraying is a thermal spray method that uses a plasma flame as a thermal spraying heat source for softening or melting a thermal spraying material. Between electrodes, arc is generated, and the arc functions to convert a working gas into plasma. Such a plasma flow is ejected from a nozzle as a plasma jet at high temperature and high speed. The plasma spraying generally encompasses coating techniques in which a material for thermal spraying is introduced to the plasma jet, then heated and accelerated, and deposited on a substrate to form a sprayed coating. The plasma spraying can be atmospheric plasma spraying (APS) that is performed in the atmosphere, low pressure plasma spraying (LPS) in which thermal spraying is performed at a lower pressure than the atmospheric pressure, or high pressure plasma spraying in which plasma spraying is performed in a pressurized container at a higher pressure than the atmospheric pressure, for example. In such plasma spraying, by using a plasma jet at about 5,000° C. to 10,000° C. to melt and accelerate a thermal spraying material, the spray particles can be hit against a substrate at a speed of about 300 m/s to 600 m/s and deposited, for example.

The high velocity flame spraying can be high velocity oxygen fuel (HVOF) thermal spraying, warm spray thermal spraying, or high velocity air fuel (HVAF) flame spraying, for example.

The HVOF thermal spraying is a flame spraying that uses a combustion flame prepared by burning a mixture of a fuel and oxygen at high pressure, as the heat source for thermal spraying. By increasing the pressure in a combustion chamber, a continuous combustion flame is ejected from a nozzle at high speed (optionally supersonic speed) as a high temperature gas flow. The HVOF thermal spraying generally encompasses coating techniques in which a material for thermal spraying is introduced to the gas flow, then heated and accelerated, and deposited on a substrate to form a sprayed coating. In the HVOF thermal spraying, for example, by feeding a slurry for thermal spraying to a supersonic combustion flame jet at 2,000° C. to 3,000° C., a dispersion medium can be removed (optionally burned or evaporated, hereinafter, the same applies) from the slurry. Concurrently, the spray particles can be softened and melted, then hit against a substrate at a high speed of 500 m/s to 1,000 m/s, and deposited. The fuel used for the high velocity flame spraying may be a hydrocarbon gas fuel such as acetylene, ethylene, propane, and propylene or may be a liquid fuel such as kerosene and ethanol. As a thermal spraying material has a higher melting point, the temperature of the supersonic combustion flame is preferably higher. From this viewpoint, a gas fuel is preferably used.

Alternatively, a thermal spraying method called warm spray thermal spraying to which the HVOF thermal spraying is applied can be adopted. The warm spray thermal spraying is typically a technique in which thermal spraying is performed in a condition where the combustion flame in the HVOF thermal spraying is mixed with a cooling gas including nitrogen or the like at around room temperature to reduce the temperature of the combustion flame, thereby forming a sprayed coating. The thermal spraying material when subjected to thermal spraying is not necessarily, completely melted, but may be partially melted or may be in a softened state at a temperature not higher than the melting point thereof, for example. In the warm spray thermal spraying, for example, by feeding a slurry for thermal spraying to a supersonic combustion flame jet at 1,000° C. to 2,000° C., a dispersion medium can be removed (optionally burned or evaporated, hereinafter, the same applies) from the slurry. Concurrently, the spray particles can be softened and melted, then hit against a substrate at a high speed of 500 m/s to 1,000 m/s, and deposited.

The HVAF thermal spraying is a thermal spraying method in which air is fed in place of oxygen as a combustion support gas in the HVOF thermal spraying. By the HVAF thermal spraying, the thermal spraying temperature can be lowered as compared with the HVOF thermal spraying. For example, by feeding a slurry for thermal spraying to a supersonic combustion flame jet at 1,600° C. to 2,000° C., a dispersion medium can be removed (optionally burned or evaporated, hereinafter, the same applies) from the slurry. Concurrently, the spray particles can be softened and melted, then the spray particles can be hit against a substrate at a high speed of 500 m/s to 1,000 m/s, and can be deposited.

In the invention disclosed here, the above slurry for thermal spraying is preferably subjected to high velocity flame spraying or plasma spraying because a dense sprayed coating having excellent plasma erosion resistance can be efficiently formed. Although not critical, when the slurry for thermal spraying contains water as the dispersion medium, high velocity flame spraying is preferably performed. When the dispersion medium contained in the slurry for thermal spraying is an organic solvent, plasma spraying is preferably performed.

Although not critical, the slurry for thermal spraying is fed to a thermal spraying apparatus preferably at a flow rate of 10 mL/min or more and 200 mL/min or less. When the slurry for thermal spraying is fed at a rate of about 10 mL/min or more, the slurry that is flowing in a device for feeding a slurry for thermal spraying (for example, a slurry feed tube) can be made in a turbulent flow state, and the extrusion force of the slurry can be increased. In addition, the spray particles can be prevented from sedimenting. Such a condition is thus preferred. From such a viewpoint, the flow rate when the slurry for thermal spraying is fed is preferably 20 mL/min or more and more preferably 30 mL/min or more. Meanwhile, when the feeding rate is excessively high, the amount of the slurry may exceed the amount of a slurry that can be thermally sprayed from a thermal spraying apparatus, and thus such a condition is unfavorable. From such a viewpoint, the flow rate when the slurry for thermal spraying is fed is appropriately 200 mL/min or less, preferably 150 mL/min or less, and more preferably 100 mL/min or less, for example.

The slurry for thermal spraying is fed to a thermal spraying apparatus preferably by an axial feed system. In other words, the slurry for thermal spraying is fed preferably in the same direction as the axis of a jet flow generated in a thermal spraying apparatus. For example, when the slurry for thermal spraying of the present invention in a slurry state is fed by the axial feed system to a thermal spraying apparatus, the thermal spraying material in the slurry for thermal spraying is unlikely to adhere to the inside of the thermal spraying apparatus because the slurry for thermal spraying has good flowability. Consequently, a dense sprayed coating can be efficiently formed. Such a condition is thus preferred.

When a common feeder is used to feed the slurry for thermal spraying to a thermal spraying apparatus, the feed amount varies periodically, and thus stable feeding may be difficult. When the feed amount of the slurry for thermal spraying oscillates due to the periodic variation of the feed amount, the thermal spraying material is unlikely to be uniformly heated in a thermal spraying apparatus, and an uneven sprayed coating can be formed in some cases. In order to stably feed the slurry for thermal spraying to a thermal spraying apparatus, a two-stroke system, or two feeders may be used in such a manner that variable periods of the feed amounts of the slurry for thermal spraying from both the feeders have opposite phases to each other. Specifically, the feeding system can be controlled to give such periods that when the feed amount of one feeder increases, the feed amount of the other feeder decreases, for example. When the slurry for thermal spraying of the present invention is fed to a thermal spraying apparatus by the two-stroke system, a dense sprayed coating can be efficiently formed because the slurry for thermal spraying has good flowability.

As the means for stably feeding a material for thermal spraying in a slurry form to a thermal spraying apparatus, the slurry sent from a feeder may be once stored in a storage tank provided just before the thermal spraying apparatus, and the slurry may be fed from the storage tank to the thermal spraying apparatus by using natural drop. Alternatively, the slurry in the tank may be forcedly fed to the thermal spraying apparatus by using a means such as a pump. When the slurry is forcedly fed by a means such as a pump, a thermal spraying material in the slurry is unlikely to adhere to the inside of a tube that connects the tank and the thermal spraying apparatus. Such a condition is thus preferred. In order to uniformize the distribution state of components in the slurry for thermal spraying in the tank, a means of stirring the slurry for thermal spraying in the tank may be provided.

The slurry for thermal spraying is fed to a thermal spraying apparatus preferably through a metal conductive tube, for example. When a conductive tube is used, static electricity can be prevented from generating, and thus the feed amount of the slurry for thermal spraying is unlikely to vary. The inner surface of the conductive tube preferably has a surface roughness Ra of 0.2 μm or less.

A thermal spraying distance is the distance from the tip of a nozzle of a thermal spraying apparatus to a substrate and is preferably set to 30 mm or more. When the thermal spraying distance is excessively small, the time for removing a dispersion medium in the slurry for thermal spraying or for softening/melting spray particles may be insufficiently secured, or a thermal spraying heat source is excessively close to a substrate, and thus the substrate may deteriorate or be deformed. Such a condition is therefore unfavorable. The thermal spraying distance is preferably about 200 mm or less (preferably 150 mm or less, for example, 100 mm or less). Such a distance allows spray particles sufficiently heated to reach to a substrate while the temperature is maintained, and thus a denser sprayed coating can be produced. For thermal spraying, a substrate is cooled preferably from the side opposite to the side undergoing thermal spraying. Such cooling can be water cooling or cooling with an appropriate refrigerant.

(Sprayed Coating)

By the above technique disclosed here, a sprayed coating is provided as a thermal spray product of the above slurry for thermal spraying. The sprayed coating includes a compound having the same composition as spray particles and/or a degradation product thereof. The sprayed coating can be formed by using a slurry for thermal spraying with good redispersibility as described above. Thus, spray particles are maintained in an appropriate dispersion state and a flow state in the slurry for thermal spraying, are stably fed to a thermal spraying apparatus, and form a dense sprayed coating in which the formation of pores is suppressed. The spray particles are not hit by a flame or a jet but can be efficiently fed to the vicinity of the center of a heat source and sufficiently softened or melted. Hence, the softened or melted spray particles densely adhere to a substrate and to each other with good adhesiveness. Accordingly, a sprayed coating having good uniformity and adhesiveness is formed.

Such a sprayed coating can preferably contain a compound containing yttrium (Y) and a halogen element (X) or a compound (Y-O-X) containing yttrium, oxygen, and a halogen element, as components, for example. Hence, as with the above explanation about the spray particles, the sprayed coating can have excellent plasma erosion resistance against halogen plasma. The sprayed coating can be so formed that the intensity ratio of the main peak of yttrium oxide ($Y_2O_3$) is 90% or less (preferably 80% or less, more preferably 70% or less, particularly preferably 60% or less, and, for example, 40% or less) on the basis of XRD diffraction, for example. The sprayed coating can be so formed that the total intensity ratio of main peaks of yttrium oxyhalides is 10% or more (preferably 20% or more, more preferably 30% or more, particularly preferably 40% or more, and, for example, 60% or more) on the basis of XRD diffraction, for example.

Some examples of the present invention will next be described, but the present invention is not intended to be limited to these examples.

EXAMPLES

Spray particles were mixed with a dispersion medium, and further mixed with additives as needed, giving of slurries for thermal spraying of samples 1 to 17. Each slurry for thermal spraying is shown in Table 1 in detail.

In Table 1, the "dispersion medium" column shows dispersion medium types used in the respective slurries for thermal spraying. In the column, "water" is distilled water as an aqueous dispersion medium, "ethanol" is ethanol alone as a nonaqueous dispersion medium, and "nonaqueous mixed solvent" is a mixed dispersion medium prepared by mixing ethanol, isopropyl alcohol (i-PrOH), and n-propyl alcohol (n-PrOH) at 85:5:10 in terms of weight ratio as a nonaqueous dispersion medium.

In Table 1, the "type of spray particles" column shows types of spray particles in the respective slurries for thermal spraying. In the column, "$YF_3$" is yttrium fluoride, "$Y_5O_4F_7$" is an yttrium oxyfluoride having the composition represented by the general formula, "$Al_2O_3$" is alumina, "$Y_2O_3$" is yttrium oxide, "YSZ" is an yttria-stabilized zirconia in which 8% by mass of yttria is introduced to zirconia ($ZrO_2$-8 wt % $Y_2O_3$), and "YOF" is an yttrium oxyfluoride having the composition represented by the general formula. When two or more types of spray particles are indicated, such spray particles are mixed particles prepared by mixing the respective spray particles having the corresponding compositions at the indicated proportions (% by mass).

In Table 1, the "average particle size of spray particles" column shows average particle sizes of spray particles used in the respective slurries for thermal spraying. The average particle sizes of spray particles with an average particle size of 1 μm or more are values measured with a laser diffraction/scattering particle size distribution analyzer, and the average particle sizes of spray particles with an average particle size of less than 1 μm are sphere equivalent diameters based on specific surface areas.

In Table 1, the "content of spray particles" column shows the contents of spray particles in the respective slurries for thermal spraying.

In Table 1, the "agglomerating agent", "viscosity modifier", "dispersant", and "fungicide" columns show types of these additives used in the respective slurries for thermal spraying. In the agglomerating agent column, "iBMC" is an isobutylene-maleic acid copolymer, and "CVP" is a carboxyvinyl polymer. In the viscosity modifier column, "PEG" is polyethylene glycol. In the dispersant column, "PC" is an aqueous polycarboxylate. In the fungicide column, "NaClO" is sodium hypochlorite, and "isothiazolone blend" is a blend of a mixed aqueous solution of 5-chloro-2-methyl-4-isothiazolin-3-one, 2-methyl-4-isothiazolin-3-one, and a magnesium salt and 2-bromo-2-nitropropane-1,3-diol. In the additive columns in the Table 1, "-" means that no additive was used.

When used, an agglomerating agent was used in such an amount that the content of the agglomerating agent in a slurry for thermal spraying was 0.2% by mass. When used, a viscosity modifier was used in such an amount that the content of the viscosity modifier in a slurry for thermal spraying was 0.2% by mass. When used, a dispersant was used in such an amount that the content of the dispersant in a slurry for thermal spraying was 0.2% by mass. When used, a fungicide was used in such an amount that the content of the fungicide in a slurry for thermal spraying was 0.2% by mass.

had a porosity of 3% or less, "good" means that a sprayed coating formed had a porosity of more than 3% and not more than 7%, "average" means that a sprayed coating formed had a porosity of more than 7% and not more than 10% or less, "poor" means that a sprayed coating formed had a porosity of more than 10%, and "-" means that no test was performed. The results with * in Example 5 and Example 10 indicate results of sprayed coatings each formed by using a slurry that was immediately after preparation and was not subjected to the precipitate disappearance test.

TABLE 1

| Sample | Dispersion medium | Type of spray particles | Average circularity of spray particles | Average particle size of spray particles (μm) | Content of spray particles (mass %) | Agglomerating agent | Viscosity modifier | Dispersant | Fungicide |
|---|---|---|---|---|---|---|---|---|---|
| 1 | Water | $YF_3$ | 0.85 | 4.4 | 40 | — | PEG | PC | — |
| 2 | Water | $YF_3$ | 0.70 | 4.4 | 40 | — | PEG | PC | — |
| 3 | Water | $YF_3$ | 0.60 | 4.4 | 40 | — | PEG | PC | — |
| 4 | Water | $YF_3$ | 0.50 | 4.4 | 40 | — | PEG | PC | — |
| 5 | Water | $YF_3$ | 0.95 | 4.4 | 40 | — | PEG | PC | — |
| 6 | Water | $Y_5O_4F_7$ | 0.85 | 1.2 | 40 | iBMC | — | PC | — |
| 7 | Water | $Y_5O_4F_7$ | 0.70 | 1.2 | 40 | iBMC | — | PC | — |
| 8 | Water | $Y_5O_4F_7$ | 0.60 | 1.2 | 40 | — | PEG | PC | NaClO |
| 9 | Water | $Y_5O_4F_7$ | 0.50 | 1.2 | 40 | — | PEG | PC | NaClO |
| 10 | Water | $Y_5O_4F_7$ | 0.95 | 1.2 | 40 | — | PEG | PC | NaClO |
| 11 | Water | 10% $YF_3$ 90% YOF | 0.85 | 3.1 | 30 | CVP | — | PC | — |
| 12 | Nonaqueous mixed solvent | 22% $YF_3$ 78% YOF | 0.70 | 3.8 | 30 | — | PEG | PC | Isothiazoline system blend |
| 13 | Nonaqueous mixed solvent | 22% $YF_3$ 78% YOF | 0.60 | 3.8 | 30 | — | PEG | PC | Isothiazoline system blend |
| 14 | Nonaqueous mixed solvent | 22% $YF_3$ 78% YOF | 0.50 | 3.8 | 30 | — | PEG | PC | Isothiazoline system blend |
| 15 | Ethanol | $Al_2O_3$ | 0.70 | 2.0 | 50 | — | — | — | — |
| 18 | Ethanol | $Y_2O_3$ | 0.70 | 4.0 | 50 | — | — | — | — |
| 17 | Ethanol | YSZ | 0.70 | 4.0 | 50 | — | — | — | — |

Next, physical properties of the slurries for thermal spraying of Samples 1 to 17 were determined, and the results are shown in Table 2.

In Table 2, the "pH", "viscosity", "sedimentation rate", and "zeta potential" columns show the measurement results of physical properties of the respective slurries for thermal spraying or the spray particles in the respective slurries, determined by the above procedures. In the "precipitate disappearance test" column in Table 2, "o" means that precipitates in a slurry for thermal spraying disappeared by the precipitate disappearance test, and "x" means that precipitates in a slurry for thermal spraying did not completely disappear. In each column, a hyphen (-) means that no measurement was performed.

The slurries for thermal spraying of samples 1 to 17 after the precipitate disappearance test were subjected to thermal spraying, and characteristics of the sprayed coatings formed by the thermal spraying were examined. The results are shown in the "coating formability 1" and "coating formability 2" columns in Table 2. The "coating formability 1" column shows the evaluation results of porosity of sprayed coatings produced by HVOF thermal spraying of the respective slurries for thermal spraying in the following conditions. The "coating formability 2" column shows the evaluation results of porosity of sprayed coatings produced by atmospheric plasma spraying (APS) of the respective slurries for thermal spraying in the following conditions. In the columns, "excellent" means that a sprayed coating formed The porosity of each sprayed coating is a value that represents the porosity of a cross section prepared by cutting a sprayed coating formed as described later, in a direction perpendicular to a substrate and is calculated by an image analysis method. Specifically, an image of a cross section of a sprayed coating was recorded, then an image analysis software was used to binarize the image into pore parts and solid phase parts (thermally sprayed spray particle parts), and the proportion of the area of pores in the total cross-sectional area was calculated as the porosity. As the image analysis software, Image-Pro (manufactured by Media Cybernetics) was used.

<APS Thermal Spraying Conditions>
Thermal spraying apparatus: "Axial III" manufactured by Northwest Mettech
Slurry feeder: "M650" manufactured by Northwest Mettech
Ar gas flow rate: 81 L/min
Nitrogen gas flow rate: 81 L/min
Hydrogen gas flow rate: 18 L/min
Plasma power: 88 kW
Thermal spraying distance: 50 mm
Thermal spraying apparatus traveling speed: 240 m/min
Feed amount of slurry for thermal spraying: 3 L/hour
<HVOF Thermal Spraying Conditions>
Thermal spraying apparatus: "Top gun" manufactured by GTV
Slurry feeder: manufactured by GTV Acetylene gas flow rate: 75 L/min
Oxygen gas flow rate: 230 L/min
Thermal spraying distance: 90 mm
Thermal spraying apparatus traveling speed: 100 m/min
Feed amount of slurry for thermal spraying: 4.5 L/hour In each of the APS thermal spraying and the HVOF thermal spraying, a plate (70 mm×50 mm×2.3 mm) made of an aluminum alloy (Al6061) was prepared and was subjected to blast treatment with brown fused alumina (A#40), and the product was used as the substrate to be subjected to thermal spraying.

TABLE 2

| Sample | pH | Viscosity (mPa·s) | Sedimentation rate (μm/s) | Zeta potential (mV) | Precipitate disappearance test | Coating formability 1 | Coating formability 2 |
|---|---|---|---|---|---|---|---|
| 1 | 7.9 | 17 | 55 | −168 | ○ | — | ⊚ |
| 2 | 7.9 | 17 | 55 | −168 | ○ | — | ⊚ |
| 3 | 7.9 | 17 | 55 | −168 | ○ | — | ○ |
| 4 | 7.9 | 17 | 55 | −168 | ○ | — | Δ |
| 5 | 7.9 | 17 | 55 | −168 | X | — | ⊚* |
| 6 | 8.8 | 25 | 54 | −74 | ○ | — | ⊚ |
| 7 | 8.8 | 25 | 54 | −74 | ○ | — | ⊚ |
| 8 | 8.7 | 22 | 36 | −75 | ○ | — | ○ |
| 9 | 8.7 | 22 | 36 | −75 | ○ | — | Δ |
| 10 | 8.7 | 22 | 36 | −75 | X | — | ⊚* |
| 11 | 8.6 | 4.3 | 68 | −134 | ○ | — | ⊚ |
| 12 | 9.1 | 6.8 | 61 | 43 | ○ | — | ⊚ |
| 13 | 9.1 | 6.8 | 61 | 43 | ○ | — | ○ |
| 14 | 9.1 | 6.8 | 61 | 43 | ○ | — | Δ |
| 15 | 7.2 | 252 | 32 | — | ○ | ○ | ○ |
| 16 | 7.5 | 167 | 35 | — | ○ | ○ | ○ |
| 17 | 7.5 | 284 | 29 | — | ○ | ○ | ○ |

As shown in Table 1 and Table 2, the slurries for thermal spraying of Samples 1 to 4, 6 to 9, and 11 to 17 are slurries having such characteristics that spray particles form precipitates, but the spray particles have an average circularity of 0.85 or less. It was ascertained that the precipitates of the spray particles disappear by a simple operation of the precipitate disappearance test. It was also revealed that these slurries for thermal spraying tend to give a smaller porosity as spray particles have a larger average circularity within a range not larger than 0.85. In other words, it was revealed that spray particles preferably have a larger average circularity within a range not larger than 0.85 (for example, 0.7 to 0.85), and a slurry for thermal spraying having good coating formability is achieved.

Of the slurries for thermal spraying of Samples 1 to 4, 6 to 9, and 11 to 17, the sprayed coatings as the thermal spray products of the slurries for thermal spraying of Samples 1 to 4 that contain yttrium fluoride alone as spray particles and the slurries for thermal spraying of Samples 6 to 9 that contain an yttrium oxyfluoride ($Y_5O_4F_7$) alone are so dense as to have a porosity of 10% or less and can have high plasma erosion resistance. As shown in Samples 11 to 14, the slurries for thermal spraying that contain yttrium fluoride and an yttrium oxyfluoride (YOF) in combination as spray particles can form sprayed coatings that have much higher erosion resistance against halogen plasma as compared with the slurries for thermal spraying containing YOF alone as the spray particles.

Meanwhile, as shown in Sample 5 and Sample 10 in which the slurries for thermal spraying contain spray particles having an average circularity of 0.95, which exceeds 0.85, it was ascertained that the spray particles that have precipitated are not redispersed by the precipitate disappearance test. The precipitates of the spray particles were tightly aggregated and deposited on the bottom of a container, and the slurries for thermal spraying were difficult to feed to a thermal spraying apparatus without treatment. Such a slurry for thermal spraying is determined to be unsuitable for practical use. For reference, the slurries for thermal spraying of Sample 5 and Sample 10 immediately after preparation and in the state in which the dispersibility of spray particles was good were subjected to thermal spraying. The results revealed that the slurries for thermal spraying of Sample 5 and Sample 10 in which no precipitate has been formed and the flowability is good can be appropriately subjected to thermal spraying.

Specific examples of the present invention have been described in detail hereinbefore, but are merely illustrative examples, and are not intended to limit the scope of claims. The techniques described in the scope of claims include various modifications and changes of the above exemplified specific examples.

What is claimed is:

1. A slurry for thermal spraying, the slurry comprising:
   spray particles; and
   a dispersion medium,
   the spray particles having an average circularity in a plan view of 0.6 or more and 0.85 or less.

2. The slurry for thermal spraying according to claim 1, wherein the spray particles have an average particle size of 100 nm or more and 8 μm or less.

3. The slurry for thermal spraying according to claim 1, wherein the spray particles include at least one type of ceramics and inorganic compounds.

4. The slurry for thermal spraying according to claim 3, wherein the inorganic compound includes a compound containing yttrium (Y) and a halogen element (X) as constituent elements.

5. The slurry for thermal spraying according to claim 4, wherein the halogen element (X) is fluorine, and the inorganic compound includes yttrium fluoride.

6. The slurry for thermal spraying according to claim 3, wherein the spray particles include a compound containing yttrium (Y), a halogen element (X), and oxygen (O) as constituent elements.

7. The slurry for thermal spraying according to claim 6, wherein the halogen element (X) is fluorine, and the compound includes an yttrium oxyfluoride.

8. The slurry for thermal spraying according to claim 3, wherein the spray particles include yttrium fluoride and an yttrium oxyfluoride.

9. The slurry for thermal spraying according to claim 1, the slurry further comprising an agglomerating agent.

10. A sprayed coating includes a thermal spray product of thermal spraying of the slurry for thermal spraying according to claim 1.

11. A method for forming a sprayed coating, the method comprising:

thermally spraying the slurry for thermal spraying according to claim 1 to form a sprayed coating.

12. The method for forming a sprayed coating according to claim 11, wherein a slurry for thermal spraying containing an organic solvent as the dispersion medium is subjected to plasma spraying to form a sprayed coating.

13. The method for forming a sprayed coating according to claim 11, wherein a slurry for thermal spraying containing water as the dispersion medium is subjected to high velocity flame spraying to form a sprayed coating.

14. The method for forming a sprayed coating according to claim 11, wherein the slurry for thermal spraying is fed to a thermal spraying apparatus by an axial feed system.

15. The method for forming a sprayed coating according to claim 11, the method comprising feeding the slurry for thermal spraying to a thermal spraying apparatus by using two feeders in such a manner that variable periods of feed amounts of the slurry for thermal spraying from the two feeders have opposite phases to each other.

16. The method for forming a sprayed coating according to claim 11, the method comprising sending the slurry for thermal spraying from a feeder, once storing the slurry for thermal spraying in a tank just before a thermal spraying apparatus, and feeding the slurry for thermal spraying in the tank to the thermal spraying apparatus by using natural drop.

17. The method for forming a sprayed coating according to claim 11, the method comprising feeding the slurry for thermal spraying to a thermal spraying apparatus through a conductive tube.

* * * * *